Figure 1:
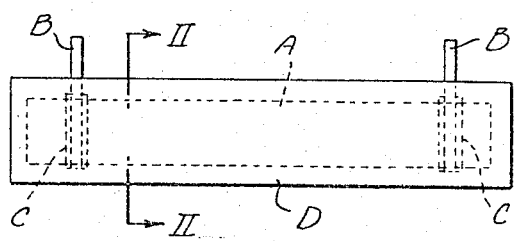

Feb. 14, 1956  D. BULGIN  2,734,978
ELECTRIC RESISTANCE ELEMENTS
Filed April 7, 1953

INVENTOR.
DOUGLAS BULGIN
BY
Benj T. Rauber
ATTORNEY

2,734,978

ELECTRIC RESISTANCE ELEMENTS

Douglas Bulgin, Birmingham, England, assignor to Dunlop Tire and Rubber Corporation, Buffalo, N. Y., a corporation of New York Application April 7, 1953, Serial No. 347,209

10 Claims. (Cl. 201—75)

My invention relates to electric resistance elements sensitive to strain, and to electrical components incorporating such elements.

For many purposes it is desirable to employ electric resistance elements whose electrical resistance is sensitive to strain; such uses include, for example, strain gauges. It is frequently desirable that very considerable deformation under stress should be possible and also that subjection to a small strain should cause a large change in electrical resistance. In metal strain gauges sensitivity is low, for example, the change in electrical resistance may be only 2% for a 1% strain and the maximum reversible extension is of the order of 1% or 2%. It has been proposed to use as resistance elements for strain gauges rubber rendered conductive by compounding it with conductive carbon black but these elements have the disadvantage that they exhibit very considerable strain and temperature hysteresis, that is, their change in electrical resistance for a given strain or change in temperature will vary with the conditions of strain or temperature to which they have previously been subjected.

In my invention an electric resistance element having an electrical resistance sensitive to strain comprises an electrically non-conductive elastic material of low permanent set having an adherent coating of a pulverulent electrically conductive material.

The non-conductive elastic material is preferably sponge rubber, i. e., a cellular rubber in which the gas cells are interconnected, and the rubber may be of natural or synthetic origin. The elastic material may alternatively be a sponge of a polymeric vinyl compound, for example, of a plasticised polymer of vinyl acetate, or vinyl chloride or of a copolymer of vinyl acetate and vinyl chloride, or a sponge of regenerated cellulose or of a cellulose ester or a solid elastic material. The pulverulent, electrically conductive material is preferably pulverulent graphite, but other forms of electrically conductive carbon black may be used, as for example, acetylene black or furnace black, and also pulverulent metals, for example, tungsten powder.

The electrical resistance elements according to my invention have a very high sensitivity to strain compared with metal strain gauges.

For elongations less than about 4% there is a linear relationship between elongation and resistance increase while from 10% upwards the law is logarithmic so that the elongation increases as the logarithm of the resistance.

Thus from 0 to 4% elongation $$R - R_0 = KE$$

and for an elongation of 10% upwards $$\log (R - R_0) = CE$$

where $R$ = Resistance at elongation E
$E$ = percent elongation
$R_0$ = Resistance at zero elongation,
$K$ and $C$ are constants.

Thus in the case of electric resistance elements in which the non-conducting material is sponge rubber a 1% elongation may cause an increase in the electrical resistance of the order of 100%–200%.

At high strains the increase in resistance is thus very considerable. For example, at an elongation of 150% the increase in resistance is of the order of a million times. The electrical resistance of the elements according to the invention is not subject to significant temperature effects. It is also not subject to strain hysteresis, i. e. when the elements are repeatedly stretched or compressed the electrical resistance under a given strain is only negligibly affected by the previous strain cycles experienced by them.

The electric resistance elements according to the invention may be made by impregnating sponge rubber with an aqueous dispersion of electrically conducting carbon and drying the sponge rubber. The carbon may be used in the form of a commercially available colloidal dispersion sold under the registered trademark "Aquadag." The amount of electrically conducting carbon or its equivalent in the electric resistance element may be such that the latter has an electrical specific resistance of 100 to 100,000 ohms per cm.$^2$ per cm. For sponge rubber specific resistances within these ranges may be obtained by depositing on the sponge rubber from 0.1% to 30% of its weight of graphite. The sponge rubber may vary in density, the preferred form having a density between .2 gm. and .5 gm. per cm.$^3$.

An important feature of electrical resistance elements according to this invention is that they are responsible to both slow and fast cyclic strains as well as to static strains, and they may therefore form the sensitive elements in electrical pick-ups, microphones and similar devices. They may also form the resistance element of strain gauges, more particularly for use in measuring strains in rubber, fabrics, biological, and other highly extensible systems.

Figure 2:
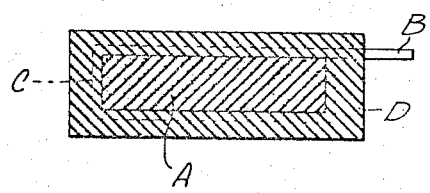

A preferred embodiment of the invention will now be described with reference to the accompanying drawings in which Fig. 1 is an elevational view of a strain gauge, and
Fig. 2 is a cross-section on the line II—II of Fig. 1.

The strain gauge comprises a strip A of sponge rubber of the type sold under the registered trademark "Dunlopillo" having a continuous adherent layer of pulverant graphite deposited on the walls of the cells of the sponge. "Dunlopillo" is a sponge rubber made by making a compounded rubber latex, setting the foam and gelling it. The deposited layer of graphite is obtained by impregnating the strip with a colloidal aqueous dispersion of graphite and drying it. Impregnation is carried out in two steps, a first impregnation, after which the strip is partially dried, followed by a second impregnation and a final complete drying. The impregnation of the strip may be performed by placing the strip in a vacuum chamber to remove the air within the cells of the sponge before immersion in the aqueous medium. Alternatively the strip may be squeezed to eliminate air contained in the sponge cells while immersed in the medium.

After final drying metal connecting members B are secured to the strip A, one adjacent each end thereof, by an adhesive layer of conductive rubber C. The members B are advantageously in the form of short lengths of wire wrapped once round the strip A with their free ends projecting laterally.

The strip is then enclosed within an outer non-conductive casing D of vulcanizable rubber which serves to protect the sponge rubber strip from damage and insulate it from the surface or system to which it may be connected. The outer casing D may also be formed by dipping the strip and connectors in rubber solution or prevulcanized latex and then drying them.

The compositions of the rubbers used depend upon the working condition of the strain gauge but an essential physical requirement is that of low permanent set.

Having described my invention, what I claim is:

1. An electric resistance element formed of electrically non-conducting elastic cellular material of low permanent set having an adherent coating of a pulverulent electrically conductive material on the surfaces of the cells thereof.

2. An electric resistance element according to claim 1 wherein the elastic material is sponge rubber.

3. An electric resistance element according to claim 1 wherein the elastic material is a sponge of a polymeric vinyl compound.

4. An electric resistance element according to claim 1 wherein the elastic material is a sponge of regenerated cellulose.

5. An electric resistance element according to claim 1 wherein the elastic material is a sponge of a cellulose ester.

6. An electric resistance element according to claim 1 wherein the pulverulent material is carbon black.

7. An electric resistance element according to claim 1 wherein the pulverulent material is graphite.

8. An electric resistance element according to claim 7 wherein the weight of graphite is from 0.1% to 30% of the weight of the strip.

9. A strain gauge comprising a strip of sponge rubber of low permanent set having a continuous adherent layer of graphite on the walls of the interconnected cells of the strip and an electrical connector secured to each end of the strip.

10. A strain gauge according to claim 9 wherein the strip is covered in non-conducting rubber of low permanent set.

References Cited in the file of this patent
UNITED STATES PATENTS

| | | |
|---|---|---|
| 2,333,476 | Duston | Nov. 2, 1943 |
| 2,341,360 | Bulgin | Feb. 8, 1944 |
| 2,429,137 | Root | Oct. 14, 1947 |
| 2,563,952 | Nichol | Aug. 14, 1951 |
| 2,589,983 | Blodgett et al. | Mar. 18, 1952 |
| 2,621,276 | Howland | Dec. 9, 1952 |
| 2,694,128 | Maurin | Nov. 9, 1954 |